United States Patent

Edstrom et al.

[15] 3,673,577

[45] June 27, 1972

[54] PROCESS CONTROL SCANNER APPARATUS

[72] Inventors: Nils Herbert Edstrom, Vallingby; Goran Anders Henrik Hemdal, Tryeso, both of Sweden

[73] Assignee: Telefanaktiebolaget LM Ericsson, Stockholm, Sweden

[22] Filed: Jan. 25, 1971

[21] Appl. No.: 109,478

Related U.S. Application Data

[63] Continuation-in-part of Ser. No. 859,315, Sept. 19, 1969.

[52] U.S. Cl. ....................340/172.5

[51] Int. Cl. ....................G05b 23/02, G06f 11/06

[58] Field of Search ....................340/172.5

[56] References Cited

UNITED STATES PATENTS

| | | | |
|---|---|---|---|
| 3,281,793 | 10/1966 | Oeters et al. | 340/172.5 |
| 3,344,406 | 9/1967 | Vinal | 340/172.5 |
| 3,400,374 | 9/1968 | Schumann | 340/172.5 |
| 3,509,539 | 4/1970 | Fichten et al. | 340/172.5 |
| 3,576,541 | 4/1971 | Kwan et al. | 340/172.5 |
| 3,579,200 | 5/1971 | Davis et al. | 340/172.5 |
| 3,585,599 | 6/1971 | Hitt et al. | 340/172.5 |

*Primary Examiner*—Paul J. Henon

*Assistant Examiner*—Jan E. Rhoads

*Attorney*—Hene, Baxley & Spiecens

[57] ABSTRACT

A process control computer scans test points arranged in groups to perform operations in accordance with changes in the states of the test points. The data store of the computer stores the states of the test points as words wherein each work represents a group of test points and the bits of the words represent the test points of the group. A flag resister of the data store comprises a group of bit cells with each bit cell being associated with one of the words. During the scan if the change of state of a test point changes, the associated bit in the data store is changed and the flange bit of the associated word is marked. Thereafter, the computer need only scan those words whose flag bits have been marked.

2 Claims, 3 Drawing Figures

INVENTORS
NILS HERBERT EDSTRÖM
GÖRAN ANDERS HENRIK HEMDAL
BY Hane, Baxley and Spiecens
ATTORNEYS INVENTORS
NILS HERBERT EDSTRÖM
GÖRAN ANDERS HENRIK HEMDAL
BY Hane, Baxley and Spiecens
ATTORNEYS INVENTORS
NILS HERBERT EDSTRÖM
GÖRAN ANDERS HENRIK HEMDAL
BY Hane, Baxley and Spiecens
ATTORNEYS

PROCESS CONTROL SCANNER APPARATUS

This application is a continuation-in-part application of copending application Ser. No. 859,315 filed Sept. 19, 1969.

SUMMARY OF THE INVENTION

This invention pertains to process control systems, and more particularly to apparatus for reducing the scanning operations performed by such computers of such systems.

In the operation of process control systems there is a cyclic scanning of the test points concerning the process being performed so that when a test point changes state the computer runs through a set of programs which control the performance of certain operations. As an example, consider a process controlled telephone system wherein the subscriber multiple is scanned and certain conditions are made or broken when the state of the subscriber equipment changes. Such scanning may be performed sufficiently often to insure that every change of state is detected. However, with a high scanning rate each scan generally detects no changes in state since such changes occur at a much slower rate. In such a case the computer is spending to much time in the unproductive scanning operation. It has therefore been proposed that a separate scanning device monitor the test points. However, such a system requires either a large transfer of information between the scanning device and the computer, or the scanning device must be provided with a separate memory and logic circuits.

It is an object of the present invention to reduce the scanning work load of the process control computer without overly complicating the scanning unit.

BRIEF DESCRIPTION OF THE DRAWINGS

Other objects, features and advantages of the invention will be apparent from the following detailed description when read with the accompanying drawing wherein.

DETAILED DESCRIPTION OF THE INVENTION

Figure 1:
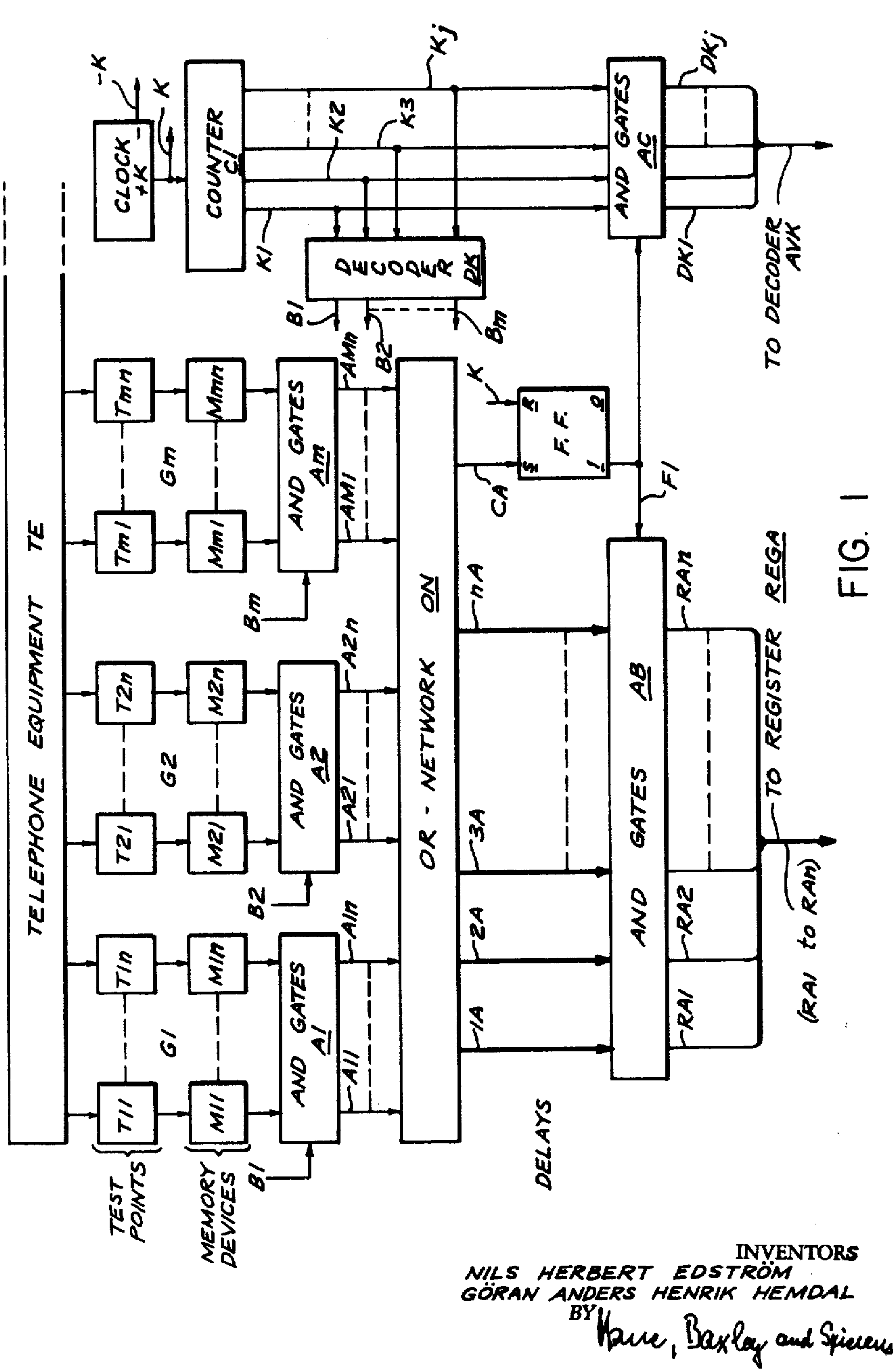
FIGS. 1 and 2 show a block diagram of a process control system utilizing the invention and FIG. 3 shows waveforms for explaining the operation of the system.

In FIG. 1 the computer controlled process equipment is shown by way of example as telephone equipment TE. Connected to the telephone equipment TE is an array of test points T11 to T *mn*. Connected to each test point is an associated memory device M11 to M*mn*. The memory devices can be capacitors which are polarity reversed when the related test points change state. The test points and their associated memory devices are divided into groups G1 to G*m* wherein each group contains *n* (say 16)units.. Thus group G1 includes memory devices M11 to M1*n* while group Gm includes memory devices M*m*1 to M*mn*. The memory devices are scanned a group at a time. To perform this scanning there are provided *m* groups of AND gates A1 to A*m*, a clock K, a decoder DK, a counter C1 and an OR-network ON. The clock K emits periodically occurring clock pulses wherein each clock pulse is present for a time *t*1 and absent for a time *t*2. The clock pulses are counted by a modulo-*m* counter, C1. For example, if there are eight groups of test points and associated memory devices then counter C1 is a three stage binary counter chain having eight unique states. The outputs K1 to K*j* of counter C1 are fed to decoder DK which decodes the coded combinations of the outputs to signals on the lines B1 to B*m*. Assuming eight groups, then for each state of counter C1 there will be an output on a different one of the lines B1 to B8. Decoder DK can be a conventional "binary-to-eight line" decoder. The AND gates A1 to A*m* can be *m* groups of *n* two-input AND gates. Typical AND gates A1 satisfy the following set of Boolean Equations: $A11 = B1 \cdot M11; A12 = B1 \cdot M12; \ldots; A1n = B1 \cdot M1n$ wherein B1 is the B1 output of decoder DK and M1*i* ($i = 1$ to $n$) is an output from one of the memory devices of the first group. Similarly, AND gates *Am*, associated with the *m*th group, has *n* two-input AND gates which satisfy the following Boolean Equations:

$$Am1 = Bm \cdot Mm1; \ldots; Amn = Bm \cdot Mmn.$$

The outputs of AND gates A1 to A*m* are fed to OR-network ON which is an array of OR circuits which satisfy the following Boolean Equations:

$$1A = A11 + A21 + \ldots + Am1$$
$$2A = A12 + A22 + \ldots + Am2$$
$$\ldots$$
$$nA = A1n + A2n + \ldots + Amn$$
$$CA = 1A + 2A + \ldots + nA.$$

From these arrays it will be apparent that for the first clock pulse a signal is present on line B1 of decoder DK and the contents of the first group G1 of memory devices M11 to M1*n* are present on output lines 1A to NA, respectively, of OR network ON. If any one of these memory devices is storing a change of state indication (represented by a binary "1") there will also be a pulse present on line CA.

Thus whenever a pulse is present on line CA the state of at least one test point of the group then being sampled has changed and an updating must take place. This is accomplished in the following manner. The leading edge of each clock pulse which is fed to the reset input of RS flip-flop FF tries to set the flip-flop to zero. If a pulse is present on line CA, connected to the set input of the flip-flop, the flip-flop remains set to one if previously set, and is set to one if previously it had been set to zero. The "1" output of flip-flop FF is connected via line F1 to AND gates AB and to AND gates AC.

AND gates AB is a set of *n* two-input AND gates which satisfy the following Boolean Equations:

$$RA1 = F1 \cdot 1A; RA2 = F1 \cdot 2A; \ldots; RAn = F1 \cdot nA$$

Figure 2:
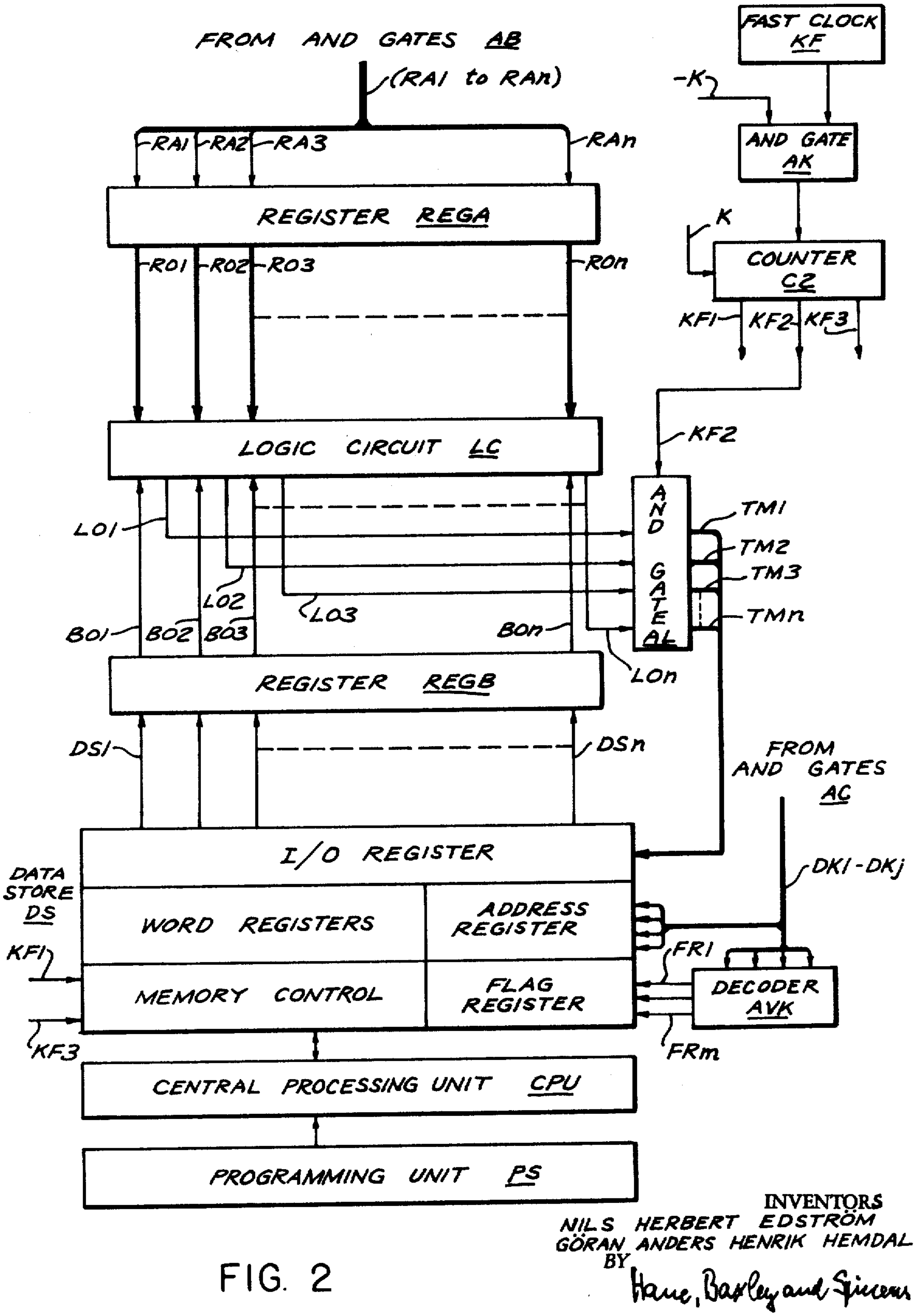

Therefore, the outputs of OR-network ON (the signals on lines 1A to *n*A) are transferred via AND gates AB to lines RA1 to RA*n*, respectively, which are collected in a cable and fed to register REGA of FIG. 2.

AND gates AC is a set of two-input AND gates which satisfy the following Boolean Equations:

$$DK1 = F1 \cdot K1; DK2 = F1 \cdot K2; \ldots; DKj = F1 \cdot Kj.$$

Thus the count (in counter C1 represented by the signals on lines K1 to K*j*) is transferred via AND gates AC to lines DK1 to DK*j* which are collected in a cable and fed to Decoder AVK of FIG. 2. The count represents the group number of the group of test points being sampled.

The bits of the word (representing the states of the memory elements of the group) on lines RA1 to RA*n* from AND gates AB are loaded in parallel into register REGA which can be an *n*-bit flip-flop register. The number of the group represented by the bits on lines DK1 to DK*j* are fed to the address register of a data store DS and to the inputs of decoder AVK which is similar to decoder DK.

Data Store DS which can be a conventional computer memory includes: an I/O register to act as an interface register; a plurality of addressable word registers which are accessed through the agency of the address register; a memory control to control the reading and writing operations; and a flag register. The addressable word registers in addition to registers containing operands and constants for a central processing unit has at least *m* registers of *n* bits each wherein each such register is associated with one of the groups of test points and wherein each bit position of the register stores a representation of the last sampled state of a test point of the group. The flag register is a one word register wherein each bit of the word is associated with a different one of the groups. If a "one" is stored in a bit position of the flag register it indicates that the state of at least one of the test points of the associated group has changed. There can be direct access to the bits of the flag register via lines FR1 to FR*m*.

The updating proceeds as follows:

During the time *t*1 of a clock pulse period a signal is present on line K which clears counter C2 and no signal is present on line —K. During the time *t*2 of a clock pulse period there is no signal on line K but there is a signal on line —K which opens AND gate AK. Connected to the input of gate AK is a fast clock KF. The clock pulses from clock KF have a rate such that at least three of these pulses occur during the time *t*2. These pulses are fed to four stage step counter C2 which was cleared to a home or zero state by the signal on line K. The first pulse from clock KF steps the counter to its one state and transmits a pulse on KF1. The second pulse steps the counter to the two state which generates a signal on line KF2, etc.

When the signal on line KF1 is generated it activates the memory control to fetch the word stored in the register whose address is stored in the address register. It will be recalled that the address register just received the address for the word representing the states of the group under scan. This word is fed, bits in parallel, to register REGB which is similar to register REGA. At this point the present changes of states of the group of test points are compared with the previous recorded changes of states of the same test points; a change of state being indications by a "one" bit. If there is no further change of state of a test point, say the *k*th test point, i.e., BO*k* = RO*k*, then the associated bit of the group word is made a zero; if there is a further change, i.e., BO*k* = RO*k* then the associated bit is made a one. Logic circuit LC performs this function.

Logic circuit LC is a group of *n* two-input exclusive OR elements satisfying the following Boolean Equations: LO1 = BO1 _ RO1; LO2 = BO2 _ RO2; . . . ; LO*n* = BO*n* _ RO*n*, where _ is the exclusive OR operator. The outputs LO1 to LO*n* of logic LC are fed to AND gates AL.

AND gates AL are a group of *n* two-input AND gates which satisfy the following Boolean Equations: TM1 = KF2 · LO1; TM2 = KF2 · LO2; . . . ; TM*n* = KF2 · LO*n*. The outputs TM1 to TM*n* from AND gates AL are fed in parallel to the I/O register of data store DS. Thus during time KF2 the new group word is returned to the data store DS.

At time KF3 the memory control writes this new word back into its own register (the address register is still storing this address) and the flag bit is recorded in the appropriate position of the flag register (the associated one of the lines FR1 to FR*n* is still activated). At this point the updating is complete and at the start of the next pulse from clock K the next group of memory units is sampled. In this way changes in the states of test points are recorded in the data store and those groups wherein changes have occurred have ones in their bit positions of the flag register.

When the central processing unit CPU scans the data store DS under control of the programming unit PS to determine which test points have changed state so as to perform control operations, it need only look at the word register whose flag bits are ones and need not look at all the word registers. Furthermore, since the central processing unit CPU scan of the data store is slower than the scan of the actual test points further time savings and more reliability, is obtained.

Figure 3:
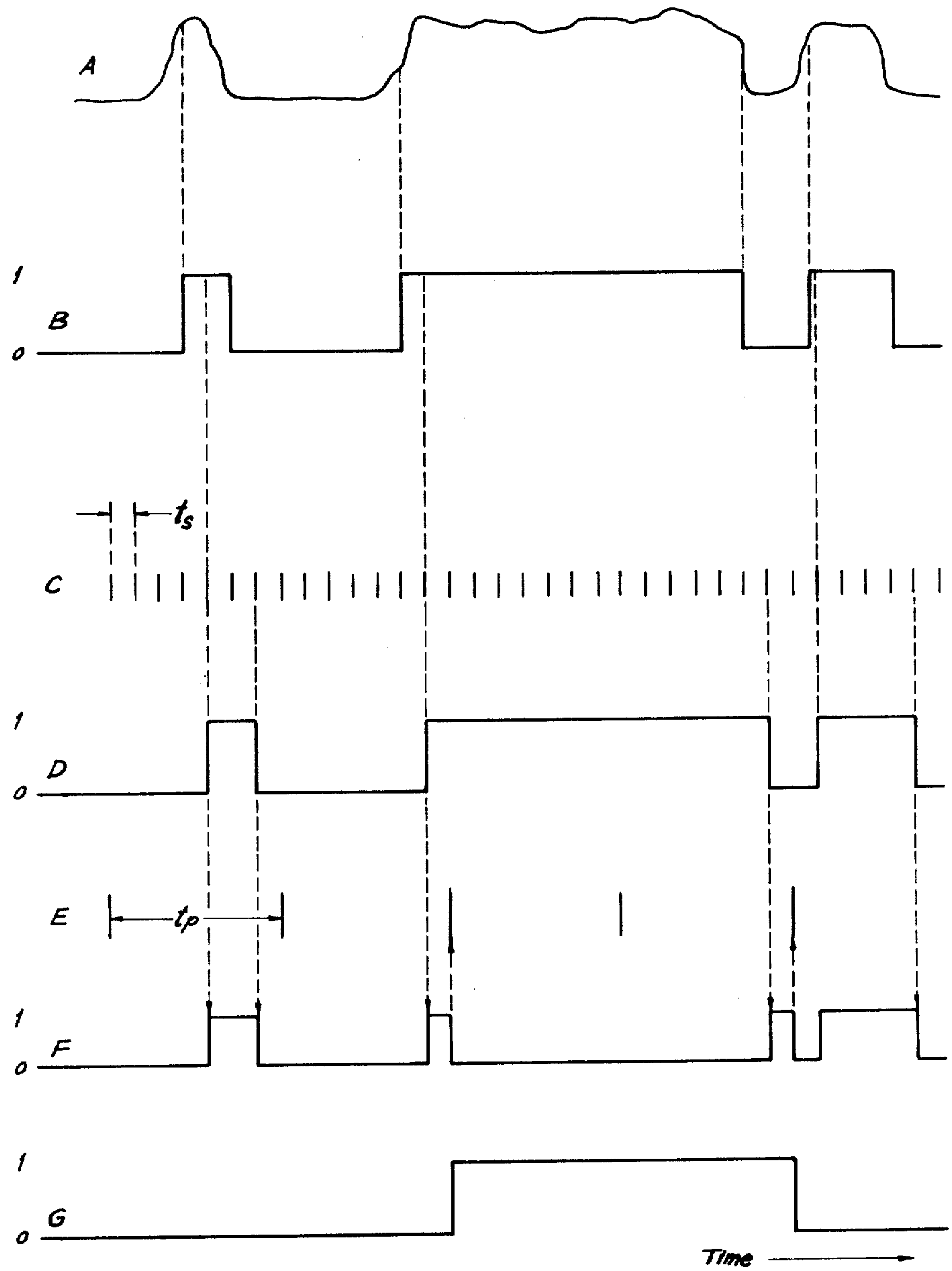

In particular, see FIG. 3. Line A shows an arbitrary incoming signal on a line which is to cause a relay to operate. Line B shows the corresponding state of the relay, where the released state is indicated by ZERO and the operated state by ONE. The scanner must detect any changes of the relay state. For this reason the scanning is performed periodically with an interval $t_s$ as indicated by line C. In each interval all the test units in a main group T11 . . . T*mn* are scanned. In order to detect changes in the relay states, an image of the test points is provided by the memory units M11 . . . Mmn. The scanner compares the state of a test point with the corresponding memory unit in order to establish whether a change of state has occurred in accordance with known techniques. When a change of relay state has occurred, the corresponding memory unit is updated,for example M11, as is shown in line D. The change of state should result in some tasks to be performed by the central processing unit CPU. In order to accomplish this, the change is stored in the data store DS in associated group word BA. The central processing unit scans this field of group words with an interval $t_p$ as shown by line E. During an interval $t_p$ more than one change of state may occur which in fact means that the second change of state cancels the first one and thus no task at all is to be performed by the central processing unit CPU. For this reason the second change of state must inhibit the first change of state stored in the data store. This is accomplished by registers REGA and REGB and logic circuit LC. When the processing unit CPU detects a change, it acknowledges the change by zero-setting all the bits indicating a change of state in the data store DS. Line F shows the corresponding value of the change of state indicating bit. Line G shows the resulting relay state as seen by the central processing unit CPU. By comparing line A and line G it is seen that disturbances are filtered out. By selecting different values of the time interval $t_p$, disturbances of different lengths can be filtered out.

What is claimed is:

1. In a process control system including a computer wherein a plurality of test points are cyclically scanned so that binary changes in the states of the test points cause the computer to perform control operations, apparatus for reducing the scanning work load of the computer comprising: a plurality of memory units, each of said memory units being connected to one of said test points and being activated to store a binary representation when the associated test point changes state, said memory units being divided into groups wherein each group comprises several memory units; a data store, said data store including a plurality of registers, each of said registers being associated with a different one of said memory unit groups and each of said registers including a plurality of bit positions, each of said bit positions storing a binary representation related to the change of state of one of said test points; means for cyclically sampling said groups of memory units such that all the memory units of a group are sampled simultaneously; means for detecting a change of state of a given test point, as indicated by its associated memory unit within a given group; a first register; means responsive to said detecting means for transferring to said first register the binary representations stored by the given group of memory units wherein a change of state has been detected; a second register; means responsive to said cyclic sampling means and said detecting means for transferring to said second register the contents of the register of said data store which contains the binary representations associated with the given group of memory units whose binary representations have been transferred to said first register; logic means connected to said first and second registers for changing the binary significance of the binary representation stored in a given bit position of said second register only when the binary representation of the corresponding bit position of said first register has a given binary significance to form an updated group word; and means for transferring said updated group word back to the register of said data store associated with said given group of memory units.

2. The apparatus of claim 1 and further comprising a flag register in said data store, said flag register comprising a plurality of bit positions, each of said bit positions being associated with a different group of said memory units, and means responsive to said detecting means for marking with a particular binary representation the bit position of said flag register associated with the given group of memory units in which a change of state was detected.

* * * * *